(12) United States Patent
Al-Khairy

(10) Patent No.: US 11,994,432 B2
(45) Date of Patent: May 28, 2024

(54) METHOD AND SYSTEM FOR DETECTING FAILURE IN AN ARRAY OF THERMOCOUPLES CONNECTED IN PARALLEL

(71) Applicant: PRATT & WHITNEY CANADA CORP., Longueuil (CA)

(72) Inventor: Issam Al-Khairy, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 232 days.

(21) Appl. No.: 17/473,321

(22) Filed: Sep. 13, 2021

(65) Prior Publication Data

US 2023/0083694 A1  Mar. 16, 2023

(51) Int. Cl.
| | | |
|---|---|---|
| G01K 15/00 | (2006.01) | |
| G01K 7/02 | (2021.01) | |
| G01K 7/026 | (2021.01) | |
| G01K 7/16 | (2006.01) | |
| G01K 13/024 | (2021.01) | |

(52) U.S. Cl.
CPC .......... *G01K 15/007* (2013.01); *G01K 7/021* (2013.01); *G01K 13/024* (2021.01); *G01K 7/02* (2013.01); *G01K 7/026* (2013.01); *G01K 7/16* (2013.01); *G01K 15/00* (2013.01)

(58) Field of Classification Search
CPC .... G01K 15/007; G01K 13/024; G01K 7/021; G01K 7/026; G01K 7/02; G01K 15/00; G01K 7/16
USPC .......................................................... 371/1
See application file for complete search history.

(56) References Cited

U.S. PATENT DOCUMENTS

| | | | |
|---|---|---|---|
| 3,829,849 A | 8/1974 | Stauffer | |
| 4,186,605 A | 2/1980 | Bourigault | |
| 4,307,335 A | 12/1981 | Paulson | |
| 4,571,689 A | 2/1986 | Hildebrand et al. | |
| 4,648,079 A | 3/1987 | Stedtnitz | |
| 4,841,286 A | 6/1989 | Kummer | |
| 6,363,330 B1 * | 3/2002 | Alag ..................... | G01K 7/026 |
| | | | 702/132 |
| 8,965,728 B2 * | 2/2015 | Snider ................... | F01D 21/003 |
| | | | 702/136 |
| 9,429,478 B2 * | 8/2016 | Honeck .................. | G01K 7/02 |
| 2011/0089931 A1 * | 4/2011 | Podlisk ................. | G01R 1/203 |
| | | | 324/126 |

(Continued)

*Primary Examiner* — Manish S Shah
*Assistant Examiner* — Christian T Bryant
(74) *Attorney, Agent, or Firm* — NORTON ROSE FULBRIGHT CANADA LLP

(57) ABSTRACT

There is described a method of detecting failure in an array of thermocouples connected in parallel. The method comprising: during an operation mode of the array of thermocouples, measuring a voltage V across the array of thermocouples, the voltage V associated with a temperature T; during a failure detection mode of the array of thermocouples, shunting the array of thermocouples, and measuring a shunt voltage Vs occurring across a resistive element connected in series with the array of thermocouples; comparing the shunt voltage Vs to an expected shunt voltage Vs_exp for the array of thermocouples at the temperature T; and generating a failure signal indicative of a detected failure in the array of thermocouples when the shunt voltage Vs deviates from the expected shunt voltage Vs_exp by more than a deviation threshold.

20 Claims, 7 Drawing Sheets

(56) References Cited

U.S. PATENT DOCUMENTS

2013/0188667 A1* 7/2013 Edwards ............... H10N 19/00
　　　　　　　　　　　　　　　　　　　　　　257/467

* cited by examiner

METHOD AND SYSTEM FOR DETECTING FAILURE IN AN ARRAY OF THERMOCOUPLES CONNECTED IN PARALLEL

TECHNICAL FIELD

The present disclosure relates generally to monitoring temperature using an array of thermocouples, and more particularly to detecting a failure in the array.

BACKGROUND OF THE ART

In order to protect an aircraft engine from exceeding operating temperature limits, the maximum temperature in the thermodynamic cycle is quantified and monitored during operation. However, the temperature of certain locations of the aircraft engine are difficult to measure due to instrumentation and material temperature limitations. Consequently, temperature instrumentation at these locations have a tendency to fail in service due to their harsh operating environment. Providing redundancy can help mitigate the consequences of such failures. For instance, the temperature instrumentation can include an array of thermocouples connected in parallel. In this way, when one of the thermocouples fail, the temperature reading provided by the array remains the same, which allows for a longer lifetime. Although existing temperature instrumentation is satisfactory to a certain degree, there remains room for improvement.

SUMMARY

In one aspect, there is provided a method of detecting failure in an array of thermocouples connected in parallel, the method comprising: during an operation mode of the array of thermocouples, measuring a voltage V across the array of thermocouples, the voltage V associated with a temperature T; during a failure detection mode of the array of thermocouples, shunting the array of thermocouples, and measuring a shunt voltage Vs occurring across a resistive element connected in series with the array of thermocouples; comparing the shunt voltage Vs to an expected shunt voltage Vs_exp for the array of thermocouples at the temperature T; and generating a failure signal indicative of a detected failure in the array of thermocouples when the shunt voltage Vs deviates from the expected shunt voltage Vs_exp by more than a deviation threshold.

In another aspect, there is provided a system for detecting failure in an array of thermocouples, the system comprising: a processing unit; and a non-transitory computer-readable medium having stored thereon program instructions executable by the processing unit for: during an operation mode of the array of thermocouples, measuring a voltage V across the array of thermocouples, the voltage V associated with a temperature T; during a failure detection mode of the array of thermocouples, shunting the array of thermocouples, and measuring a shunt voltage Vs occurring across a resistive element connected in series with the array of thermocouples; comparing the shunt voltage Vs to an expected shunt voltage Vs_exp for the array of thermocouples at the temperature T; and generating a failure signal indicative of a detected failure in the array of thermocouples when the shunt voltage Vs deviates from the expected shunt voltage Vs_exp by more than a deviation threshold.

In another aspect, there is provided a circuit comprising: an array of thermocouples connected in parallel and defining a first terminal and a second terminal for measurement of a voltage V thereacross, the voltage V associated with a temperature T; a resistive element connected in series between the first terminal and a third terminal; a shunting device connectable across the second terminal and the third terminal; and a controller operatively coupled to the circuit for selective operation thereof in an operation mode and in a failure detection mode.

DESCRIPTION OF THE DRAWINGS

Reference is now made to the accompanying figures in which.

DETAILED DESCRIPTION

Figure 1:
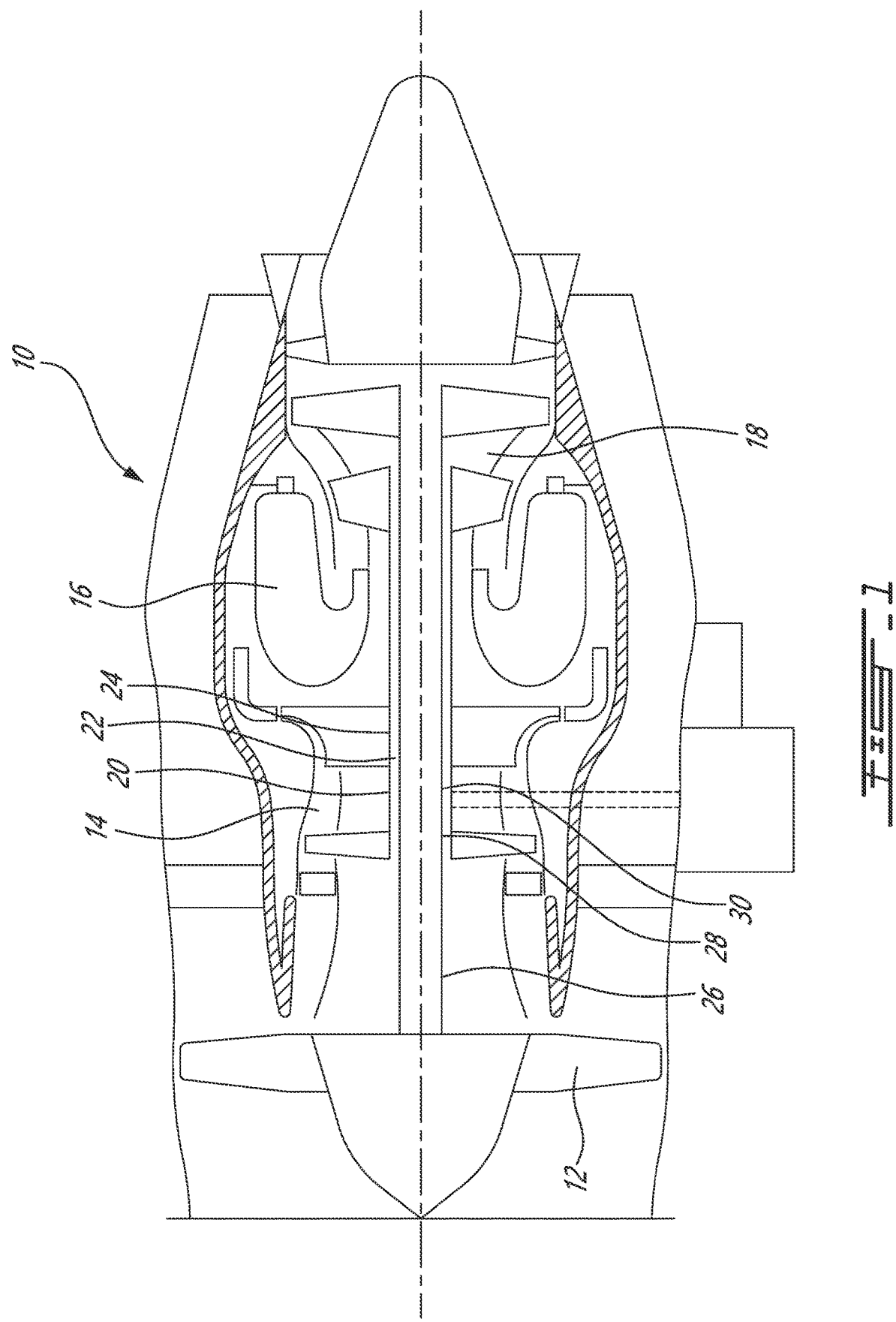
FIG. 1 is a schematic cross-sectional view of an example gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan 12 and to low pressure rotor(s) 30 of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and an output shaft through which power is transferred. A turboprop engine or hybrid engine may also apply. In addition, although the gas turbine engine 10 is described herein for flight applications, it should be understood that other uses, such as industrial or the like, may apply.

Figure 2:
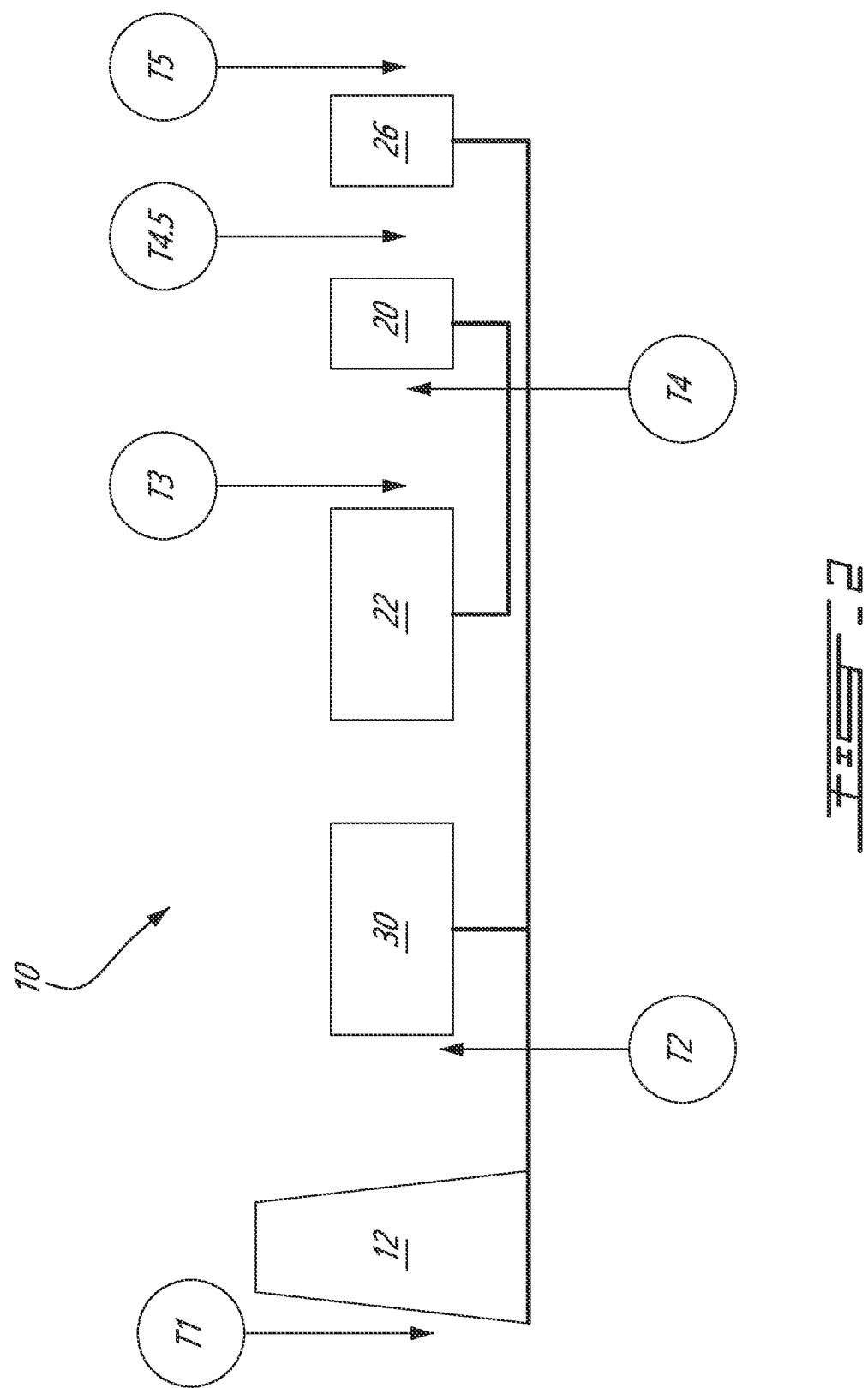
FIG. 2 is a schematic side view of a gas turbine engine showing example temperature measurement locations.

As air passes through the gas turbine engine 10, it undergoes numerous pressure and temperature changes along the way. The path along which air flows is referred to as the "gas path." Example temperature measurement points for the airflow along the gas path are illustrated in FIG. 2. T1 refers to an inlet temperature, taken just as the air enters through the fan rotor 12. T2 refers to a low pressure compressor inlet temperature, taken before the low pressure rotors 30 of the compressor section 14. T3 refers to a high pressure compressor delivery temperature, taken after the high pressure rotors 22 of the compressor section 14. T4 refers to a combustor outlet temperature, taken before the high pressure rotors 20 of the turbine section. T5 refers to the turbine outlet temperature, taken after the low pressure rotors 26 of the turbine section 18. In some other embodiments, the temperature measurement points can differ from the ones illustrated in FIG. 2.

In order to protect the gas turbine engine 10 from exceeding operating temperature limits, the maximum temperature in the thermodynamic cycle of the gas turbine engine 10 is quantified and monitored during operation. The maximum temperature usually occurs at location T4, which can be very difficult to measure due to instrumentation and material temperature limitations. Instead, the temperature at location T4 may be correlated with a temperature measured downstream from location T4, where the temperature is cooler, such as location T4.5, which is sometimes referred to as an inter-turbine or indicated turbine temperature (ITT) and is taken between the high pressure rotors 20 and low pressure rotors 26 of the turbine section 18. T4 to T4.5 correlations can be determined during the development phase of the gas turbine engine 10, and can be implemented in the engine control system.

Figure 3:
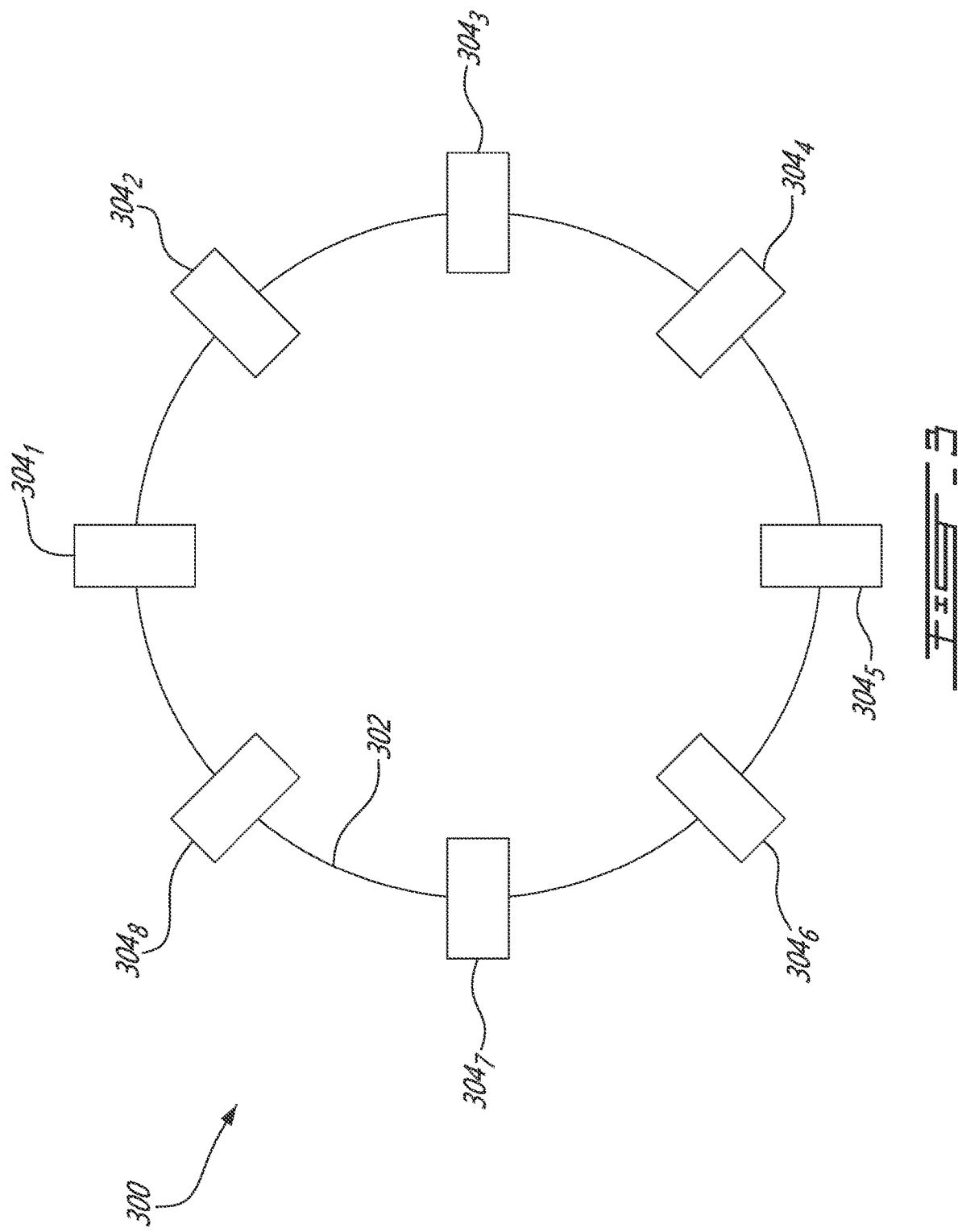
FIG. 3 is a schematic diagram of an example array of thermocouples.

In some embodiments, the temperature at any location of gas turbine engine 10, for example at location T4.5, is measured using an array of thermocouples. The array can have a number N of thermocouples. The array of thermocouples may be disposed independently or may be supported by a harness having a given geometry. An example array of thermocouples mounted on a harness is illustrated in FIG. 3. In this example, a harness 302 has a circular geometry and holds N=8 thermocouples $304_1$-$304_8$ to form the array 300. Other geometries for the harness 302 may also be used, such as ellipsoid, oval, rectangular, square, and the like, such that a circumference of the gas turbine engine 10 is surrounded by the harness 302. Although shown as closed, the harness 302 may also be open, for example in a U-shape, a V-shape, curvilinear or linear. Other harness geometries may also apply, depending on practical implementation. The number N of thermocouples and their location on the harness 302 may vary, depending on practical implementation.

Figure 4:
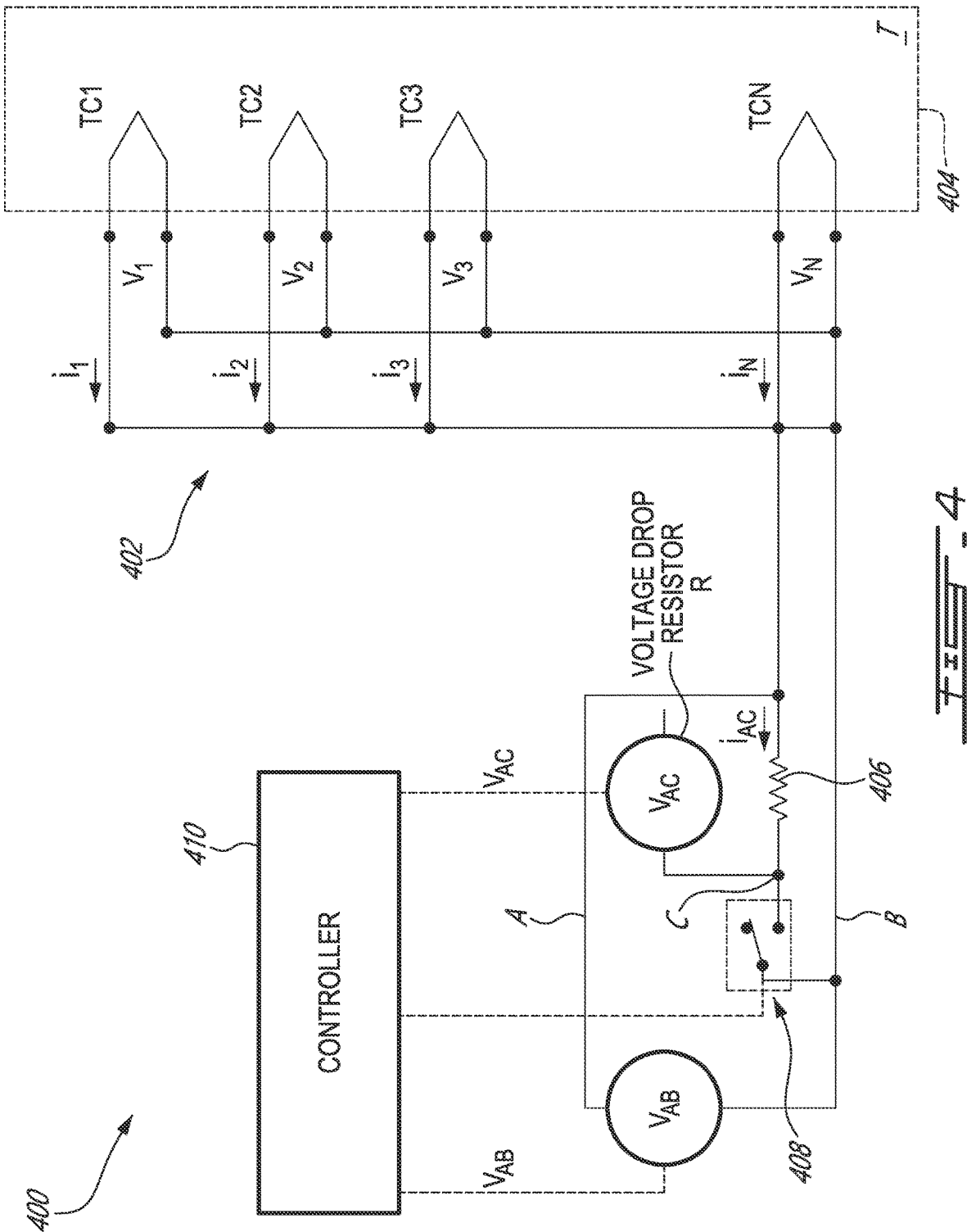
FIG. 4 is a schematic view of a circuit incorporating the array of thermocouples of FIG. 3.

FIG. 4 shows an example circuit 400 having an array 402 of thermocouples $TC_N$ connected in parallel. As shown, there is a number N of thermocouples $TC_N$ in the array 402, where the number N is an integer greater than unity. For instance, the number N can be 4, 8, 16 and the like. Each of the thermocouples $TC_N$ has two different electrically conducting materials connected to one another to form a hot junction and a cold junction. As per the Seebeck effect, an electromotive force develops across the two junctions when a temperature difference exists between the hot junction and the cold junction of the thermocouple. The electromotive force creates a difference of potential across each thermocouple, and this difference of potential, or voltage Vi, is proportional to the temperature difference. The thermocouples $TC_N$ are connected in parallel between a first terminal A and a second terminal B. Accordingly, the voltage measured across the first and second terminals A and B, i.e., $V_{AB}$, is indicative of an average of the individual voltages $V_N$, i.e., the sum of the individual voltages $V_N$ divided by the number N of thermocouples in the array 402:

$$V_{AB} = \frac{\sum_{i=1}^{N} V_i}{N} = \frac{V_1 + V_2 + \ldots + V_N}{N}. \tag{1}$$

Accordingly, a single voltage measurement can factor in all of the individual voltages $V_N$ at the same time. The voltage $V_{AB}$ can then be processed to obtain the temperature T surrounding the array 402 of thermocouples $TC_N$:

$$T = f(V_{AB}) \tag{2}$$

In some embodiments, all of the thermocouples $TC_N$ of the array 402 are disposed in a common area 404 of a gas turbine engine of a given temperature T. As such, $V_1 = V_2 = = V_N$, and equation (1) becomes:

$$V_{AB} \cong \frac{N \cdot V_N}{N} \cong V_N. \tag{3}$$

When one thermocouple $TC_N$ fails, an open circuit is created for that broken thermocouple, and one of the individual voltages $V_N$ goes to zero as no current can flow across the open circuit. In this situation, the reading of the voltage $V_{AB}$ may not indicate any anomaly even if one or more of the thermocouples $TC_N$ has failed. A thermocouple failure would thus be undetectable solely based on the reading of the voltage $V_{AB}$, unless all of the thermocouples $TC_N$ fail which would yield a null voltage $V_{AB}$. Equation (3) thus remains true even if one or more of the thermocouples, but not all, of the thermocouples fail. The circuit 400 is provided to detect the failure of one or more thermocouple $TC_N$ of the array 402.

As depicted, the circuit 400 has a resistive element 406 connected in series between a first terminal A and a third terminal C, a shunting device 408 connectable across the second terminal B and the third terminal C, and a controller 410 for selective operation of the circuit 400 in an operation mode and in a failure detection mode. The resistive element 406 can be provided in the form of any component suitable for providing an electrical resistance, including, but not limited to, a resistor of resistivity R. The shunting device 408 may be an electrical switch, as illustrated, or any other component suitable for connecting second terminal B to third terminal C so as to form a path for current to travel across the resistive element 406 and into/out of the array 402.

In the operation mode, the shunting device 408 is in an open state and the controller 410 measures the voltage $V_{AB}$ across the array 402 of thermocouples $TC_N$. The measured voltage $V_{AB}$ is associated with a temperature T, as the voltage across the array 402 of thermocouples $TC_N$ is dependent on the temperature of the area 404 in which lay the thermocouples $TC_N$. The temperature T is indicative of the temperature surrounding the array of thermocouples at the time the voltage measurement is made. In the failure detection mode, the array 402 of thermocouples $TC_N$ is shunted via the shunting device 408, and a shunt voltage $V_{AC}$ is measured across the resistive element 406 connected in series with the array 402 of thermocouples $TC_N$.

It is expected that since the thermocouples $TC_N$ produce corresponding individual voltages Vi, they also produce individual currents $i_i$ as per Ohm's Law. In the illustrated circuit 400, the individual currents $i_i$ merge together to flow across the resistive element 406 when the array 404 of thermocouples $TC_N$ is shunted:

$$I_{AC} = \Sigma_{i=1}^{N} I_i = I_1 + I_2 + \ldots + I_N. \tag{4}$$

With the resistive element 406 providing a resistivity R, and Ohm's Law, equation (4) becomes:

$$V_{AC} = R \cdot I_{AC} \Sigma_{i=1}^{N} I_i = R \cdot (I_1 + I_2 + \ldots + I_N), \tag{5}$$

when the N thermocouples function properly, and because the thermocouples are generally at the same temperature T, accordingly $I_1 \cong I_2 \cong \ldots \cong I_N$ and equation (5) becomes:

$$V_{AC} \cong R \cdot N \cdot I_N. \quad (6)$$

If a number Nf of the N thermocouples has failed, N becomes N-Nf in equation (6):

$$V_{AC'} \cong R \cdot (N-N_f) \cdot I_N, \quad (7)$$

with $V_{AC'}$ denoting the shunt voltage $V_{AC}$ when at least one of the thermocouples has failed. If all of the thermocouples have failed, then N=Nf and the voltage $V_{AC'}$ goes to zero as discussed above. However, if 0<Nf<N, the measured voltage $V_{AC'}$ will deviate from an expected value for the shunt voltage $V_{AC}$ when all of the thermocouples are working at the temperature T. As each of the thermocouples $TC_N$ produce the same amount of individual current $i_i$ at the same temperature T, each thermocouple failure will incur an incremental drop $\Delta V_{AC'}$ to the shunt voltage $V_{AC}$, the incremental drop corresponding to $\Delta V_{AC} \cong R \cdot I_N$. By monitoring the shunt voltage $V_{AC}$ and comparing it to an expected shunt voltage $V_{AC\_exp}$ at the temperature T, a thermocouple failure may be detected.

Figure 5:
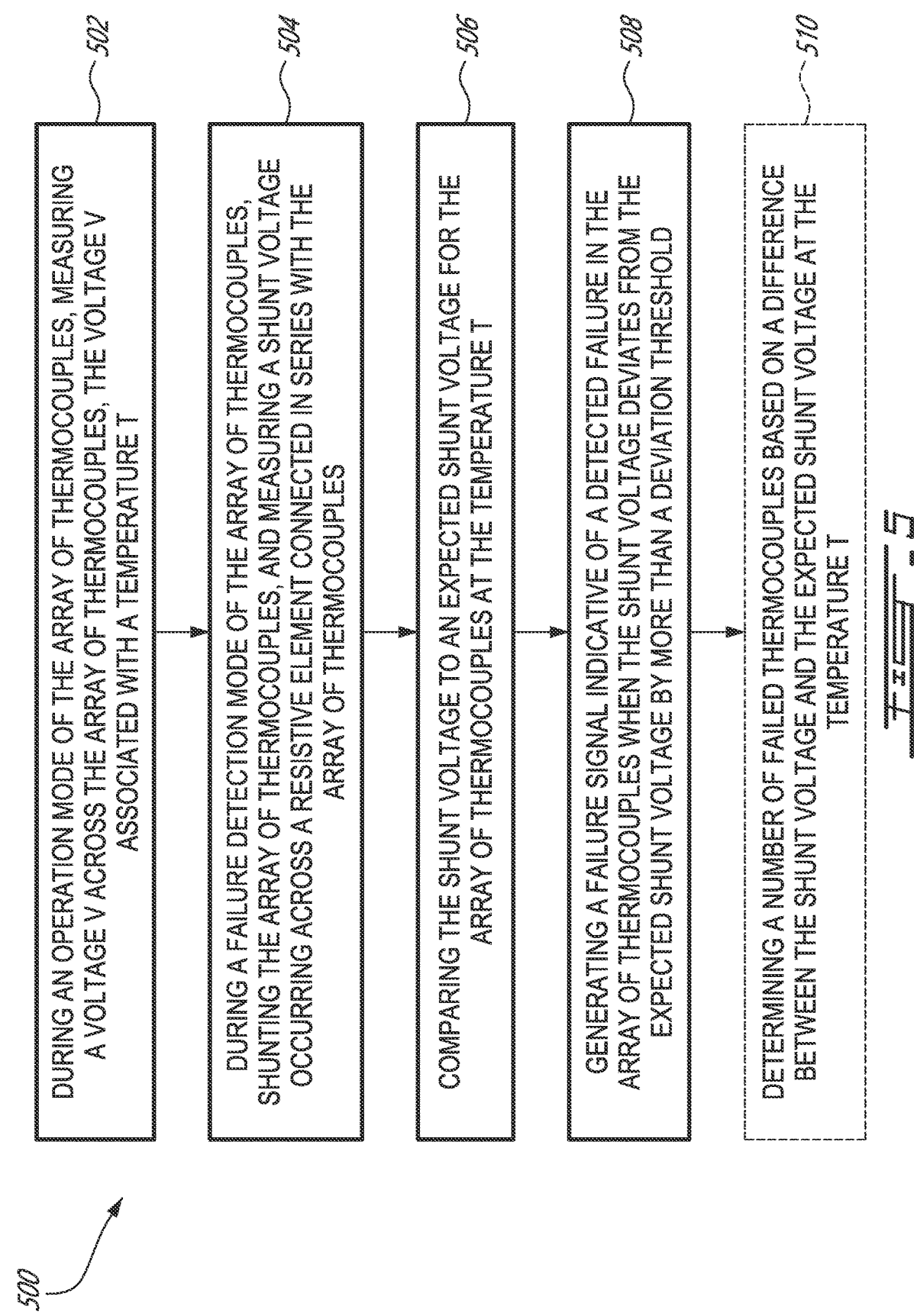
FIG. 5 shows a flow chart of an example of a method for detecting failure in an array of thermocouples connected in parallel.

FIG. 5 shows an example of a method 500 for detecting a failure in an array of thermocouples connected in parallel. The method 500 can be performed by the circuit 400 described above with reference to FIG. 4.

At step 502, during an operation mode of the array of thermocouples, a voltage V across the array of thermocouples is measured. The voltage V is associated with a temperature T. In some embodiments, a voltage $V_1$ is associated to a temperature $T_1$, a voltage $V_2$ is associated to a temperature $T_2$, a voltage $V_3$ is associated to a temperature $T_3$, and so forth.

At step 504, during a failure detection mode of the array of thermocouples, the array of thermocouples is shunted and a shunt voltage occurring across a resistive element connected in series with the array of thermocouples is measured.

At step 506, the shunt voltage Vs is compared to an expected shunt voltage $V_{s\_exp}$ for the array of thermocouples at the temperature T. For instance, if the temperature is determined to be temperature T1, the expected shunt voltage $V_{s\_exp,1}$ may be used.

At step 508, a signal indicative of a detected failure in the array of thermocouples is generated when the shunt voltage Vs deviates from the expected shunt voltage $V_{s\_exp}$ by more than a deviation threshold D. In other words, the signal can be generated upon determining that:

$$|V_s - V_{s\_exp}| > D. \quad (8)$$

The deviation threshold D is set to a value that takes into account an acceptable difference between the measured voltage Vs and the expected voltage $V_{s\_exp}$, for example due to the precision of the measurement equipment. In some embodiments, the deviation threshold D is set to a value that corresponds to an expected voltage drop when one thermocouple $TC_N$ of the array has failed. The deviation threshold D may be determined through testing, simulation, modeling and the like. In some embodiments, the deviation threshold D can be of about 150 mV, preferably about 100 mV and most preferably about 50 mV.

The signal issued at step 508 may be used to set a maintenance flag, trigger a warning, or any other form of alert indicative of the failure.

In some embodiments, and as provided at step 510, a number Nf of failed thermocouples is determined based on a difference between the shunt voltage $V_s$ and the expected shunt voltage $V_{s\_exp}$ at the temperature T. More specifically, the number Nf of failed thermocouples can be given by a mathematical equation equivalent to the following equation:

$$N_f = N \cdot \left( \frac{V_{s,exp} - V_s}{V_{s,exp}} \right), \quad (9)$$

as per equations (6) and (7). In some embodiments, the method 500 includes a step of a generating an alert signal upon determining that the number Nf of thermocouple failures is above a given threshold number. For instance, the given threshold number can be 1, 2 or more depending on the embodiment. In some embodiments, such an alert signal is generated when two or fewer of the thermocouples are still working, indicating that maintenance should be performed to avoid misreadings at the location of the array. This alert signal may be the same or different from the signal generated at step 508 of the method 500. In some embodiments, the method 500 includes a step of generating an alert signal upon determining that the number of working thermocouples is below a given threshold number. In some embodiments, the signal(s) generated by the controller is(are) stored in a non-transitory memory system, communicated to a network, or both.

In some embodiments, a signal indicative that the array of thermocouples is fully functional is generated upon determining that the measured shunt voltage $V_s$ does not deviate from the expected shunt voltage $V_{s\_exp}$ by more than the deviation threshold D.

In some embodiments, step 504 comprises activating a shunting device, such as an electrical switch connecting the resistive element in series with the array of thermocouple, upon initiation of the failure detection mode and de-activating the shunting device upon termination of the failure detection mode. In some embodiments, the method 500 further comprises a step of monitoring failures in the array of thermocouples by initiating the failure detection mode at a given frequency. For instance, the failure detection mode can be performed at a frequency of 1 minute, 1 hour or 1 day depending on the embodiment. The failure detection mode can also be performed on demand in some embodiments, or at every start-up and/or shutdown of the engine. Various commands used for operation of the engine 10 may be used to trigger the failure detection mode of the circuit 400.

It is intended that the array of thermocouples is disposed in a hot area of an aircraft engine in some embodiments. In embodiments where the aircraft engine is a gas turbine engine, the array of thermocouples can circumferentially surround a turbine section of the gas turbine engine. In embodiments where the aircraft engine is a gas-electricity hybrid engine, the array of thermocouples can surround a battery pack of the gas-electricity hybrid engine.

The controller 410 shown in FIG. 4 can be provided as a combination of hardware and software components. The software components of the controller 410 can be implemented in the form of a controller application 600, an example of which is described with reference to FIG. 6. Moreover, the hardware components of the controller 410 can be implemented in the form of a computing device 700, an example of which is shown in FIG. 7. In some embodiments, the controller 410 can be implemented as part of a full-authority digital engine controls (FADEC) or other similar device, including electronic engine control (EEC), engine control unit (ECU), and the like.

Figure 6:
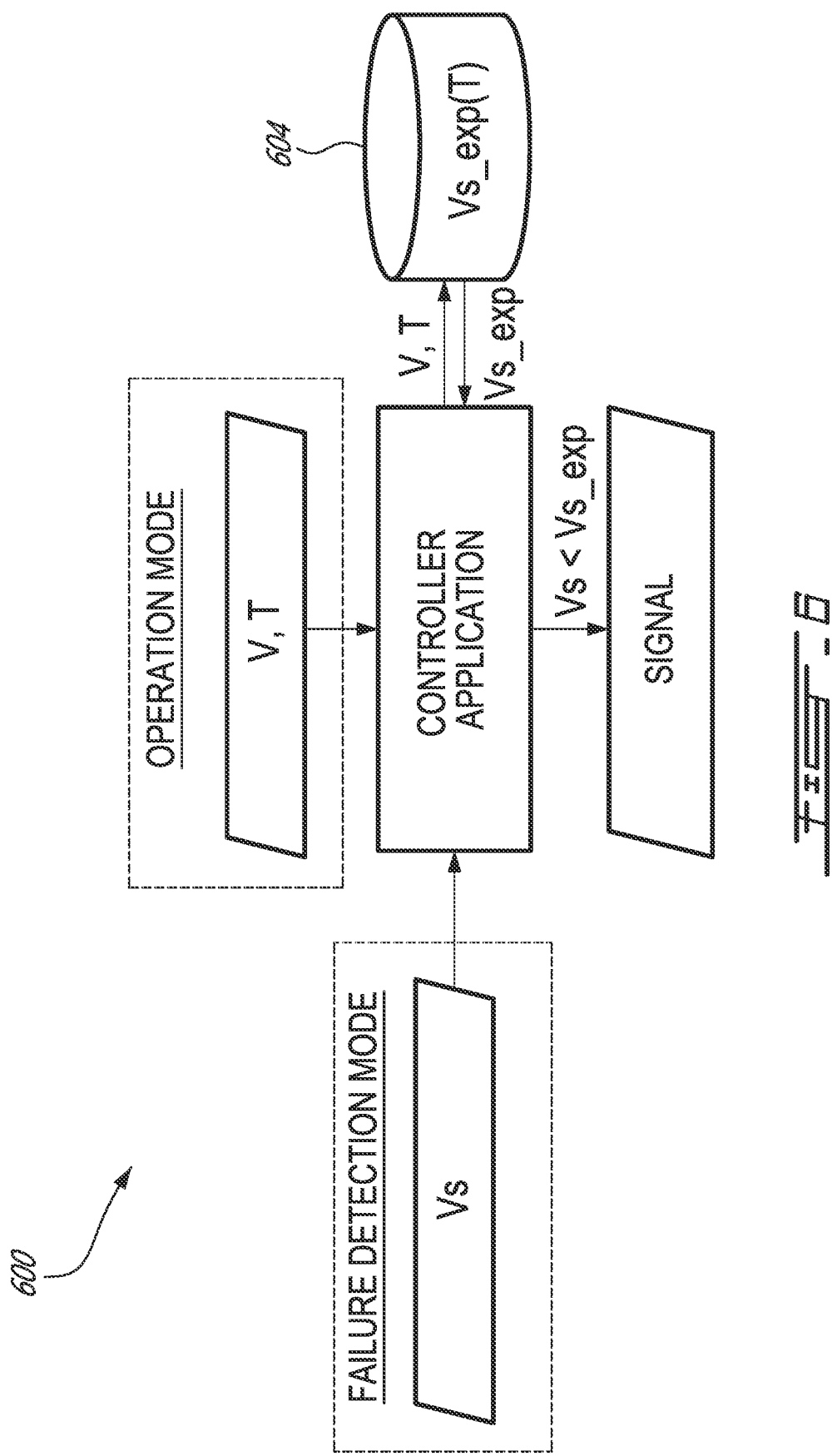
FIG. 6 is a block diagram of an example controller application of the controller of FIG. 4.
Figure 7:
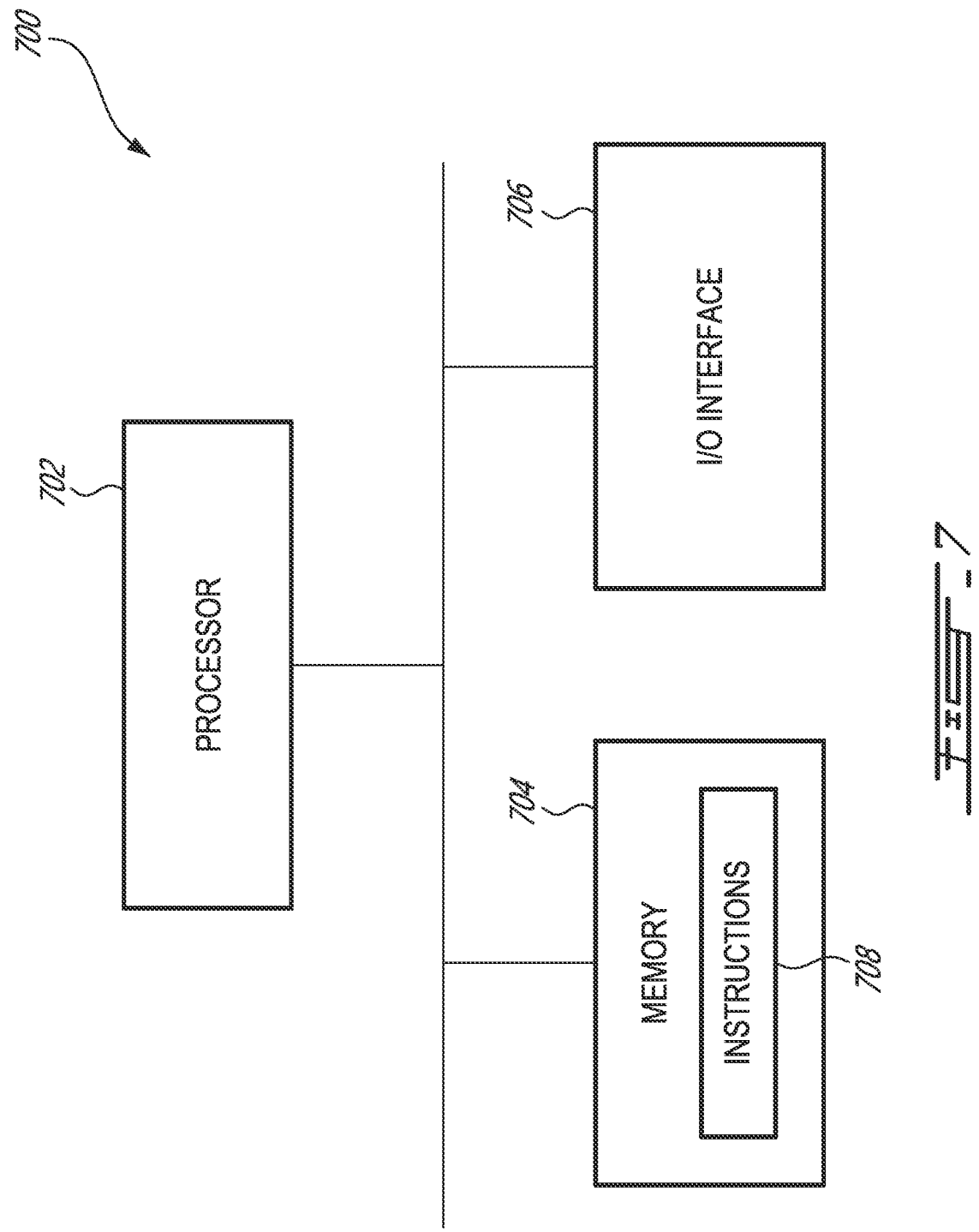
FIG. 7 is a block diagram of an example computing device.

Referring now to FIG. 6, the controller application 600 is configured to receive, in the operation mode of the circuit 400, the measured voltage $V_{AB}$ which can be associated with the temperature T surrounding the array of thermocouples at the moment the voltage $V_{AB}$ was measured, as per equation (2). As per equation (2), the measured voltage $V_{AB}$ is converted into temperature T using a known relationship between $V_{AB}$ and T. In the failure detection mode, the controller application 600 is configured to receive the shunt voltage Vs measured across the resistive element when the array of thermocouple is shunted via the shunting device. As depicted, the controller application 600 has access to a storage medium 604 including expected shunt voltages $V_{s\_ref,i}$ for different temperatures $T_i$. Table 1 below shows an example.

TABLE 1

Expected shunt voltages $V_{s\_ref,i}$ for different temperatures $T_i$, where i varies from 1 to 3, and shunt voltages $V_s$ as a function of the number of failed thermocouples Nf

| $T_1$ | | $T_2 (T_2 > T_1)$ | | $T_3 (T_3 > T_2)$ | |
|---|---|---|---|---|---|
| Nf | $V_s$ [mV] | Nf | $V_s$ [mV] | Nf | $V_s$ [mV] |
| 0 ($V_{s\_exp,1}$) | 1000 | 0 ($V_{s\_exp,2}$) | 2000 | 0 ($V_{s\_exp,3}$) | 4000 |
| 1 | 800 | 1 | 1600 | 1 | 3200 |
| 2 | 600 | 2 | 1200 | 2 | 2400 |
| 3 | 400 | 3 | 800 | 3 | 1600 |
| 4 | 200 | 4 | 400 | 4 | 800 |
| 5 | 0 | 5 | 0 | 5 | 0 |

For instance, in an exemplary scenario in which an array of 5 thermocouples is used, the measured voltage $V_{AB}$ corresponds to temperature T2 and the shunt voltage Vs is measured to be 800 mV. In this scenario, the controller application 600 detects a deviation of the shunt voltage Vs from the expected shunt voltage $V_{s\_exp,2}$=2000 mV by more than the deviation threshold D. In this embodiments, a deviation threshold D of about 50 mV was found convenient. Accordingly, the controller application 600 generates a signal indicative of a detected failure in the array of thermocouples. The number Nf of failed thermocouples can be determined using equation (9) above. For instance:

$$N_f = N \cdot \left(\frac{V_{s,exp,2} - V_s}{V_{s,exp,2}}\right) = 5 \cdot \left(\frac{2000 \text{ mV} - 800 \text{ mV}}{2000 \text{ mV}}\right) = 3.$$

Alternatively, using the data shown in Table 1, the controller application 600 may also determine the number Nf of failed thermocouples. In this case, as the shunt voltage Vs is 800 mV, the controller application can deduce that the number of failed thermocouples is 3. Accordingly, the controller application 600 may determine the number Nf of failed thermocouples by using a mathematical formula (or known relationship) or by using a look-up table. Other embodiments may also apply. In this specific example, a shunt voltage Vs of 2000 mV would not have deviated from the expected shunt voltage $V_{s\_exp,2}$ by more than the deviation threshold D and no such signal would have been generated.

It is noted that the expected shunt voltages $V_{s\_exp}$ depend on the temperature of the array of thermocouple. If for instance the measured voltage V would have corresponded to temperature T1, then no deviation would have been observed between the shunt voltage Vs of 800 mV and the expected shunt voltage $V_{s\_exp,1}$=800 mV at temperature T1.

Referring to FIG. 7, the computing device 700 can have a processor 702, a memory 704, and I/O interface 706. Instructions 708 for performing the operation mode, the failure detection mode or any step described above can be stored on the memory 704 and accessible by the processor 702.

The processor 702 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 704 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 706 enables the computing device 700 to interconnect with one or more input devices, such as the circuit, the shunting device, or with one or more output devices such as an accessible memory system and external network.

Each I/O interface 706 enables the controller 410 to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

It is noted that the controller application 600 is stored on the memory 704 and accessible by the processor 702 of the computing device 700. The computing device 700 and the controller application 600 described above are meant to be examples only. Other suitable embodiments of the controller 410 can also be provided, as it will be apparent to the skilled reader.

The methods described herein may be implemented in a high level procedural or object oriented programming or scripting language, or a combination thereof, to communicate with or assist in the operation of a computer system, for example the computing device 700. Alternatively, the methods may be implemented in assembly or machine language. The language may be a compiled or interpreted language. Program code for implementing the methods may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods may also be considered to be implemented by way of a non-transitory computer-readable storage medium having a computer program stored thereon. The computer program may comprise computer-readable instructions which cause a computer, or more specifically the processor 702 of the computing device 700, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the method and system described herein can be used to detect thermocouple failure in any type of aircraft engines including, but not limited to, gas turbine engines such as turbofan engines, turboprop engines, turboshaft engines, hybrid engines, and electric engines. Yet further modifications could be implemented by a person of ordinary skill in the art in view of the present disclosure, which modifications would be within the scope of the present technology.

The invention claimed is:

1. A method of detecting failure in an array of thermocouples connected in parallel, the method comprising:
   during an operation mode of the array of thermocouples, measuring a voltage V across the array of thermocouples, the voltage V associated with a temperature T;
   during a failure detection mode of the array of thermocouples, shunting the array of thermocouples, the shunting comprising activating an electrical switch connecting a resistive element in series with the array of thermocouples connected in parallel upon initiation of the failure detection mode, and measuring a shunt voltage Vs occurring across the resistive element connected in series with the array of thermocouples;
   comparing the shunt voltage Vs to an expected shunt voltage Vs_exp for the array of thermocouples at the temperature T; and
   generating a failure signal indicative of a detected failure in the array of thermocouples when the shunt voltage Vs deviates from the expected shunt voltage Vs_exp by more than a deviation threshold.

2. The method of claim 1 further comprising determining a number Nf of failed thermocouples based on a difference between the shunt voltage Vs and the expected shunt voltage Vs_exp.

3. The method of claim 2 wherein the array of thermocouples has a number N of thermocouples, the number Nf of failed thermocouples being given by a mathematical equation equivalent to the following equation:

$$N_f = N \cdot \left( \frac{V_{s\_exp} - V_s}{V_{s\_exp}} \right).$$

4. The method of claim 3 further comprising generating an alert signal upon determining that the number Nf of failed thermocouples is above a given threshold number.

5. The method of claim 1 further comprising generating a healthy signal indicative that the array of thermocouples is fully functional upon determining that the measured shunt voltage Vs does not deviate from the expected shunt voltage Vs_exp by more than the deviation threshold.

6. The method of claim 1 wherein said shunting comprises de-activating the electrical switch upon termination of the failure detection mode.

7. The method of claim 1 further comprising monitoring said array of thermocouples by initiating the failure detection mode repeatedly at a given frequency.

8. The method of claim 1 wherein the array of thermocouples is disposed across an aircraft engine.

9. The method of claim 8, wherein the operation mode and the failure detection mode are enabled by an engine controller.

10. A system for detecting failure in an array of thermocouples, the system comprising:
    a processing unit; and
    a non-transitory computer-readable medium having stored thereon program instructions executable by the processing unit for:
       during an operation mode of the array of thermocouples, measuring a voltage V across the array of thermocouples, the voltage V associated with a temperature T;
       during a failure detection mode of the array of thermocouples, shunting the array of thermocouples, the shunting comprising activating an electrical switch connecting a resistive element in series with the array of thermocouples connected in parallel upon initiation of the failure detection mode, and measuring a shunt voltage Vs occurring across the resistive element connected in series with the array of thermocouples;
       comparing the shunt voltage Vs to an expected shunt voltage Vs_exp for the array of thermocouples at the temperature T; and generating a failure signal indicative of a detected failure in the array of thermocouples when the shunt voltage Vs deviates from the expected shunt voltage Vs_exp by more than a deviation threshold.

11. The system of claim 10 further comprising determining a number Nf of failed thermocouples based on a difference between the shunt voltage Vs and the expected shunt voltage Vs_exp.

12. The system of claim 11 wherein the array of thermocouples has a number N of thermocouples, the number Nf of failed thermocouples being given by a mathematical equation equivalent to the following equation:

$$N_f = N \cdot \left( \frac{V_{S\_exp} - V_S}{V_{S\_exp}} \right).$$

13. The system of claim 12 further comprising generating an alert signal upon determining that the number Nf of failed thermocouples is above a given threshold number.

14. The system of claim 10 wherein further comprising generating a healthy signal indicative that the array of thermocouples is fully functional upon determining that the measured shunt voltage Vs does not deviate from the expected shunt voltage Vs_exp by more than the deviation threshold.

15. The system of claim 10 wherein said shunting includes de-activating the electrical switch upon termination of the failure detection mode.

16. The system of claim 10, wherein the processing unit forms part of an aircraft engine controller.

17. A circuit comprising:
an array of thermocouples connected in parallel and defining a first terminal and a second terminal for measurement of a voltage V thereacross, the voltage V associated with a temperature T;
a resistive element connected in series between the first terminal and a third terminal;
a shunting device connectable across the second terminal and the third terminal, the shunting device connecting the resistive element in series with the array of thermocouples connected in parallel; and
a controller operatively coupled to the circuit for selective operation thereof in an operation mode and in a failure detection mode.

18. The circuit of claim 17 wherein the array of thermocouples is disposed in an aircraft engine.

19. The circuit of claim 18 wherein the aircraft engine is a gas turbine engine, the array of thermocouple circumferentially surrounding a turbine section of the gas turbine engine.

20. The circuit of claim 18 wherein the controller is an engine controller.

* * * * *